UNITED STATES PATENT OFFICE.

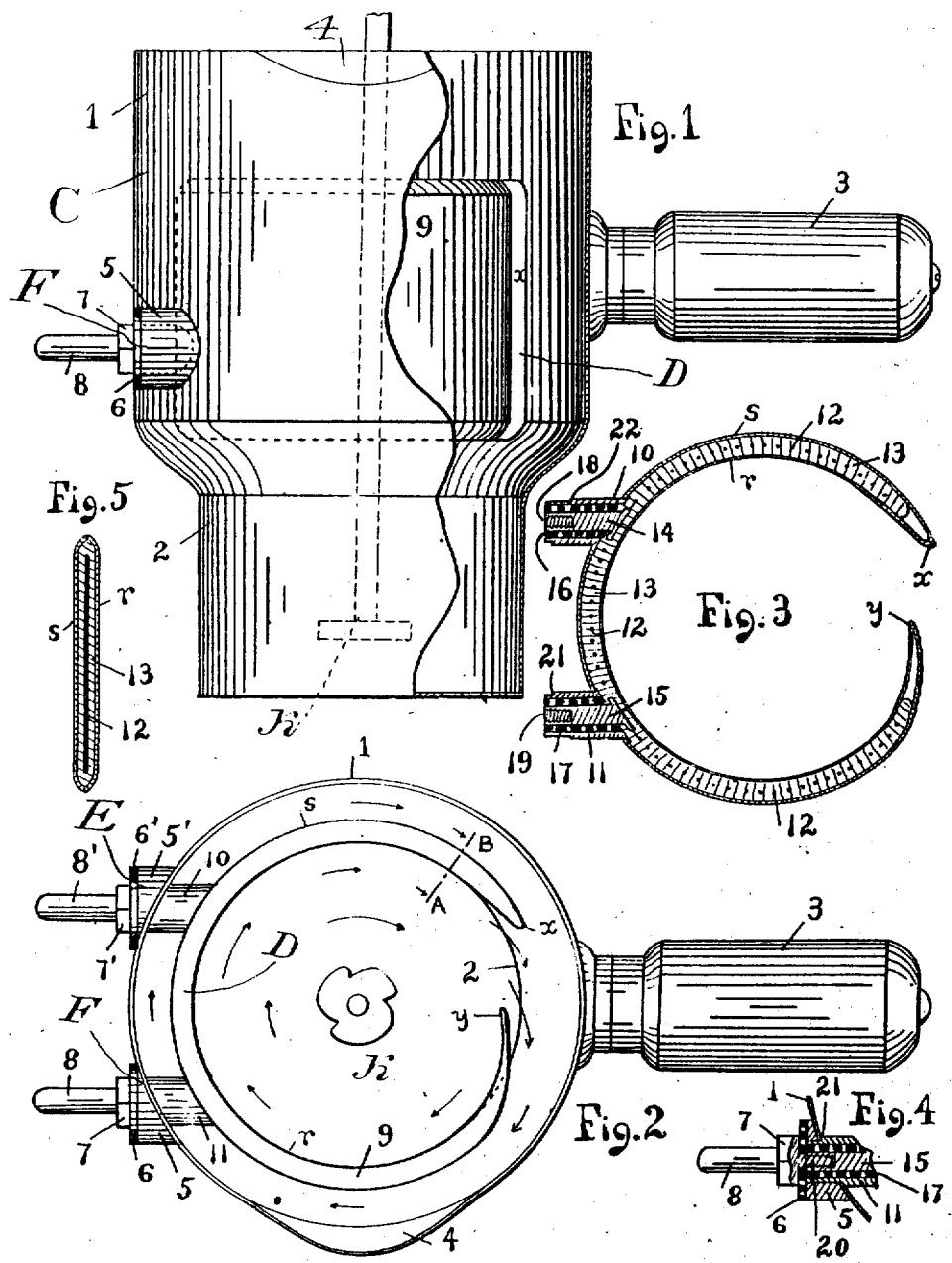

WILLIAM P. ROBERTSON, OF NEW YORK, N. Y.

ELECTRICALLY-HEATED CUP OR CONTAINER.

1,269,646.

Specification of Letters Patent.    Patented June 18, 1918.

Application filed September 15, 1916.   Serial No. 120,310.

*To all whom it may concern:*

Be it known that I, WILLIAM P. ROBERTSON, of the city, county, and State of New York, U. S. A., am the inventor of certain new and useful Improvements in Electrically-Heated Cups or Containers, of which the following is a specification.

This invention relates to improvements in electrically heated cups and containers, and the object of the invention is to provide a simple and effective device of this class which will rapidly heat the liquid placed therein, and may be rapidly cleaned, and in which the several elements will be of simple design and well adapted to perform the functions required of them.

A further object of the invention is to so position and support the electrical heating element, that all radiated heat thereof, will be taken up by the food and beverage in the container whereby the rapid heating is effected without loss of heat.

A further object of the invention is to adapt the same for effective use in a combined electrical food or beverage mixer and heater such as shown in my application for Letters Patent, filed June 15th, 1916, under Serial #103,827, which resulted in Patent Number 1,227,935, and to provide means whereby the liquid when agitated may be caused to circulate on both sides of the heating element.

A still further object of the invention is to enable the heating element to be readily attached or replaced.

A still further object of the invention is to enable the heating element to be used in connection with porcelain, glass or other non-metallic containers, and in which the walls will not be unduly heated from the heating element.

With these and other objects in view the invention comprises the improvement and arrangements of parts hereafter described in detail in the accompanying specification and drawings.

Referring to the drawings:

Figure #1 is a side elevation of the cup or container with a portion of the cup cut away to expose a part of the heating elements. Fig. #2 is a plan view of the cup or container showing the position of the heating element. Fig. #3 is a horizontal section of the heating element detached from the cup, or container, taken on a line through the center of the two projections carrying the terminals of the heating wires or coil. Fig. #4 is a horizontal section through one of the projections of the heating element, showing the mode of attachment, to the side of the cup or container and the insulation and attachment of the terminal plug to one of the terminals of the heating coil or element. Fig. #5 is a sectional view through the lines A and B of Fig. #2.

Referring to Fig. #1 of the drawing: The cup or container C is of any convenient size or shape; as shown it is formed with an upper cylindrical portion (1) and a lower portion (2') of smaller diameter. The smaller lower portion may be readily engaged by the resilient metal holders generally employed in electric food and beverage mixers or agitators. The cup C is provided with a suitable handle, (3) and a pouring lip (4). Within the cup and spaced from the wall thereof is the heating element D provided with suitable current connectors E and F which extend through the wall of the container, preferably on the opposite side to the handle B. These connectors which also serve as supporters include projections (5) and (5') preferably cylindrical and secured to the outside of the cup. Resting upon each projection (5) and (5') are washers (6) and (6') of insulating material upon which rests the nut heads, (7) and (7') which are a part of the projecting metal plug on pins (8) and (8') forming the electrical terminals as hereinafter explained. The construction of heating element (9) is shown in the sectional view, Figs. 3 and 5 in which (*r*) and (*s*) are respectively an outer and inner air-tight shell of metal incased resistance wires or elements, (12) which are embedded in porcelain (13) or other insulating material or means for insulating the resistance wires. The terminals of the resistance wires are attached respectively to two metal connectors (14) and (15) which pass outward from the heating element, the said connections being properly insulated from their respective casings (10) and (11) by the respective insulating bushings, (16) and (17). The outer ends of (14) and (15) are tapped and threaded to form sockets (18) and (19)

which are adapted to receive the threaded projections 20 on the removable terminal pins (8) and (8').

The cup is designed particularly to be used with the ordinary type of electric food and beverage mixer of which only the stirrer or agitator K is shown in the drawings. This mixer for example would be of the type shown in my aforesaid application Serial #103,827. To cause effective and rapid heating of the circulating food or beverage means are provided to deflect the material in the cup to opposite sides of the heating element.

It will be noted in Figs. 2 and 3 that one end (y) of the casing is carried inward, and the other end (x) is flared slightly outward to form deflecting wings whereby when the food or beverage within the container is being rapidly agitated from left to right by agitator K of the mixer, the current thereby created and shown by the arrows will be deflected by the end (y) thus creating a circulation on both sides of the heating element, resulting thus in a more rapid heating process.

Fig. 4 shows in detail the means employed in attaching the outer terminal plugs to the terminal connectors of the heating element, and also the means of holding this securely in position with respect to the surrounding cup or container. The connections shown with respect to one terminal in Fig. 4, (both terminal connections being identical) are as follows: In the sides of the cup C is bored a hole of a diameter to secure and pass the outer end of the casing (11) up to the flange (21) which abuts against the inside of the cup C and this holds the heating element the proper distance away from the inside circumference of the cup C. The other metal projection (5) is also bored with the same diameter as the hole referred to, and is so placed and attached that there is thus a concentric circular outlet through the cup or container and the outer metal projections. The connecting plug (8) has a nut like head (7) with a further threaded projection (20). The said threaded projection passes through a tight hole in the insulating washer (6) and screws into the top (19) of the connector, (15) Fig. 3, thus forming a tight insulating connection between the outer terminal plug and the terminal connections of the heating element and at the same time holding the heating element securely in position through the flanges (21) and (22) which tighten against the inner side of the cup or container.

It is clearly evident that, by unscrewing the terminal plugs, the entire heating element may be disengaged from the inside of the cup or container, and another inserted if so desired. The terminal plugs (8) and (8') are to be connected in any suitable sockets connected to the source of electricity the current thus passing through the resistance wires forming a part of the heating element.

It will be noted that the terminals 8 and 8' are on the opposite side of the cup from the handle 3, and consequently the terminals may be engaged with their sockets by a direct forward pressure on the handle. This enables the cup to be connected and disconnected from the source of current by a very simple movement.

It will also be noted that the heating element D lies in the enlarged upper portion of the cup, and has the same diameter as the lower portion with its center in the same vertical line as the center of the lower portion, whereby a clear space is left for the mixing element in the center of substantially the diameter of the lower portion 2.

It is evident from the above descriptions that other details of construction may be resorted to by those skilled without departing from the spirit and scope of my invention and the appended claims.

What I claim is:—

1. An electric heating device comprising a container, a metal incased electric resistance element therein, tubular supporting members extending through the container but insulated therefrom and supporting the resistance element in position out of contact with the inner surface of the container, and connectors for the resistance elements mounted in the tubular members but insulated therefrom.

2. An electric heating container comprising a cup, an electric heating element on the interior spaced from the wall, and means on the ends of the heating element adapted to deflect liquid circulated in the cup to opposite sides of the heating element.

3. In combination a container, a mixing element therein, a heating element in the container and means to deflect the material circulating in the container to opposite sides of the element.

4. An electric heating device comprising a container, a metal incased C-shaped electrical heating element therein spaced from the inner wall thereof substantially parallel thereto, tubular members extending through the wall of the container adapted to support the heating element and being insulated from the wall of the container and connectors in the tubular members insulated therefrom.

5. An electric heating container including a C-shaped heating element therein, spaced from the wall thereof having the ends deflected to cause circulation of liquid on both sides of the element.

6. In combination, a container, a heating element therein, including a hollow casing and resistance wire insulated therefrom, tubular members connected to the casing and projecting through the wall of the container, terminal pins connected to the resistance wire, but insulated from the tubular members.

7. In combination, a container, a heating element therein, including a hollow casing and resistance wire, tubular members connected to the casing and projecting through the wall of the container, terminal pins connected to the resistance wire, but insulated from the tubular members, said pins being formed with outer removable portions.

8. An electrical heating device comprising a container having the upper section larger than the lower section, a metal incased electric heating element in the upper section, spaced from the walls thereof of a diameter substantially the same as the lower section and located concentrically thereabove, means for holding the heating element in a rigid position in relation to the walls of the container and means insulated from the walls of the container for carrying the terminals of the heating elements to the exterior thereof.

9. An electrical heating device comprising a container having the upper section larger than the lower section, a metal incased electric heating element in the upper section spaced from the walls thereof of a diameter substantially the same as the lower section and located concentrically thereabove, means for holding the heating element in a rigid position in relation to the walls of the container, and means insulated from the walls of the container for carrying the terminals of the heating elements to the exterior thereof and a handle on the opposite side of the container from the terminals.

10. An electrical heating device comprising a container having an upper section larger than the lower section, a C-shaped heating element in the upper section spaced away from the walls of a diameter substantially the same as the lower section and located concentrically thereabove, means for supporting the heating element in position and supplying the same with current, and means on the heating element adapted to deflect the liquids being heated to opposite sides of the elements.

In witness whereof I have hereunto signed my name in the presence of two subscribing witnesses.

WILLIAM P. ROBERTSON.

Witnesses:
RUSSEL B. SMART,
JOHN T. MACGREGOR.